(12) United States Patent
Cosentino et al.

(10) Patent No.: US 8,637,146 B2
(45) Date of Patent: Jan. 28, 2014

(54) METALLIZED OPAQUE FILMS WITH ROBUST METAL LAYER ATTACHMENT

(75) Inventors: Steven Cosentino, Quinton, VA (US); Jan S. LaRiviere, Chesterfield, VA (US); Keith Kulesza, Midlothian, VA (US); Sherrod B. Tatum, Midlothian, VA (US)

(73) Assignee: DuPont Teijin Films U.S. Limited Partnership, Chester, VA (US)

( * ) Notice: Subject to any disclaimer, the term of this patent is extended or adjusted under 35 U.S.C. 154(b) by 18 days.

(21) Appl. No.: 13/298,998

(22) Filed: Nov. 17, 2011

(65) Prior Publication Data

US 2013/0130015 A1     May 23, 2013

(51) Int. Cl.
  B32B 3/26    (2006.01)
  H05H 1/24    (2006.01)
  C23C 16/06   (2006.01)

(52) U.S. Cl.
  USPC .......... 428/319.1; 428/319.3; 428/317.9; 428/317.1; 427/576; 427/250; 427/555

(58) Field of Classification Search
  USPC .............. 428/319.3, 319.1, 317.9, 317.1; 427/250, 576, 555
  See application file for complete search history.

(56) References Cited

U.S. PATENT DOCUMENTS

| | | |
|---|---|---|
| 3,107,139 A | 10/1963 | Cornforth et al. |
| 3,871,947 A | 3/1975 | Brekken |
| 4,165,210 A | 8/1979 | Corbett |
| 4,375,494 A | 3/1983 | Stokes |
| 4,440,801 A * | 4/1984 | Aviram et al. ............ 427/558 |
| 4,780,402 A | 10/1988 | Remmington |
| 5,576,073 A | 11/1996 | Kickelhain |
| 5,593,739 A | 1/1997 | Kickelhain |
| 5,985,437 A | 11/1999 | Chappell, Jr. et al. |
| 7,073,246 B2 | 7/2006 | Bhullar et al. |
| 2004/0266930 A1 * | 12/2004 | Nishi et al. ............ 524/430 |

FOREIGN PATENT DOCUMENTS

| | | |
|---|---|---|
| DE | 100 43 576 A1 | 3/2002 |
| DE | 10 2007 051 241 A1 | 4/2009 |
| EP | 1 524 291 A1 | 4/2005 |
| GB | 838708 | 6/1960 |
| GB | 1115007 | 5/1968 |

OTHER PUBLICATIONS

Mazet, Jean-Francois, International Search Report and Written Opinion for International Application No. PCT/US2012/063822 dated Jan. 17, 2013, 8 pages.

* cited by examiner

*Primary Examiner* — Hai Vo
(74) *Attorney, Agent, or Firm* — RatnerPrestia

(57) ABSTRACT

A multilayer composite film includes in sequence:
a) a biaxially oriented, opaque polyester base layer;
b) a non-voided polyester layer on and coextensively in contact with a surface of the base layer; and
c) a metal layer on a surface of the non-voided polyester layer opposite the opaque polyester base layer, or on a primer layer on a surface of the non-voided polyester layer opposite the opaque polyester base layer.

The film may be prepared by vapor depositing or plasma depositing a metal layer on a surface of a non-voided polyester layer coextensively contacting a biaxially oriented, opaque polyester base layer, or on a primer layer on a surface the non-voided polyester layer.

17 Claims, 1 Drawing Sheet

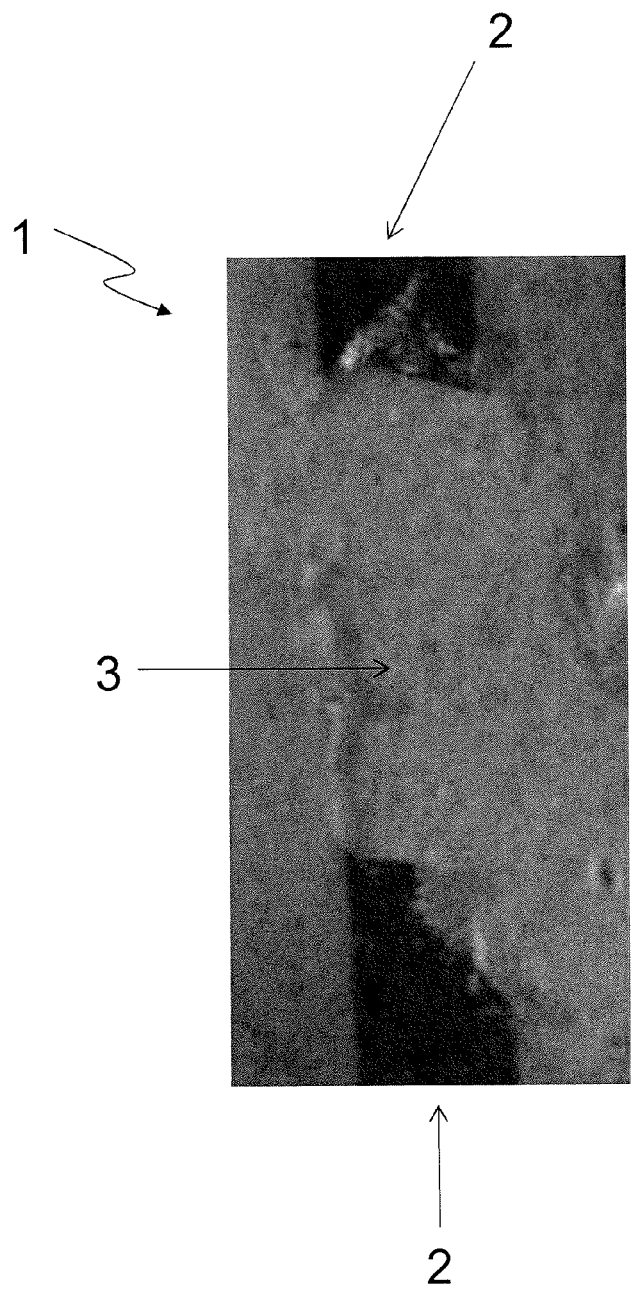
PRIOR ART

METALLIZED OPAQUE FILMS WITH ROBUST METAL LAYER ATTACHMENT

BACKGROUND OF THE INVENTION

Multilayer composite films having conductive metal patterns on at least one surface have been described for use in making sensors and/or test strips in biomedical and other applications. For example U.S. Pat. No. 7,073,246 describes a biosensor that includes an electrically conductive material on a polymeric base layer and electrode patterns formed on the base, with the patterns having different feature sizes. The patterns are formed by partially removing conductive material from the base using broad field laser ablation so that less than 90% of the conductive material remains on the base and the electrode pattern has an edge extending between two points. Other layers and features are also present, and such a device may be used, for example, in measuring blood glucose levels. In this and other applications, it is often preferred or required that the polymeric base layer be opaque for aesthetic reasons and/or to hide the internal circuitry of the strip. Suitable opaque polymeric films are known in the art, and typically contain a pigment and/or a voiding agent to produce the opacity. It is also preferred that the base material be flexible for ease of converting and production of strips, but also of adequate stiffness to allow easy insertion by the patient into the test meter. It will be apparent that the resulting product should be robust enough to withstand handling in the manufacturing process, sometimes under less than careful conditions.

SUMMARY OF THE INVENTION

In one aspect, the invention provides a multilayer composite film that includes in sequence:
a) a biaxially oriented, opaque polyester base layer;
b) a non-voided polyester layer on and coextensively in contact with a surface of the base layer; and
c) a metal layer on a surface of the non-voided polyester layer opposite the opaque polyester base layer, or on a primer layer on a surface of the non-voided polyester layer opposite the opaque polyester base layer.

In another aspect, the invention provides a method of making the multilayer composite film described above. The method includes a step of vapor depositing or plasma depositing a metal layer on a surface of a non-voided polyester layer coextensively contacting a biaxially oriented, opaque polyester base layer, or on a primer layer on a surface the non-voided polyester layer.

BRIEF DESCRIPTION OF THE DRAWING

The drawing shows an image of a prior art film revealing the loss of a portion of a sputtered gold line from the surface of a voided polyethylene terephthalate film upon application and removal of a pressure-sensitive adhesive tape.

DETAILED DESCRIPTION OF THE INVENTION

It has been found that patterned metal layers formed by laser ablation of coextensive metal layers on pigmented and/or microvoided polymeric base layers may suffer cracking, flaking, and/or delamination from the base layers during production and use. This results in potential loss of electrical continuity in circuit patterns formed from the metal layers, and may result in erroneous test results. Even pigmented films that are not microvoided may exhibit problems, resulting from surface irregularities that translate into irregularities in the metal layer surface. Surface irregularities provide areas where metal adhesion can be compromised, and metal can be selectively abraded from the surface irregularities during normal production processing. This can potentially cause point defects in the electrical circuit, and also create dust and debris that subsequently cause contamination problems in the manufacturing process.

Problems with metal cracking, delamination and/or surface irregularities are greatly reduced or largely eliminated according to the invention by interposing a non-voided polyester layer between the opaque base layer (an opaque, pigmented and/or voided polyester layer) and the metal layer. The invention therefore provides a multilayer composite film comprising in sequence:
a) a biaxially oriented, opaque polyester base layer;
b) a non-voided polyester layer coextensively contacting a surface of the base layer; and
c) a metal layer on a surface of the non-voided polyester layer, or on a primer layer on a surface the non-voided polyester layer. The optional primer layer may be included to improve adhesion of the metal layer to the non-voided polyester layer.

In some embodiments, the composite film includes a second non-voided polyester layer coextensively contacting a second surface of the base layer, i.e., on the side of the base layer opposite the first metal layer. This may be of advantage if the film is to be supplied in rolls, in which case the second non-voided polyester layer prevents direct contact between the somewhat delicate metal layer and the relatively rough/uneven surface on the other side of the base layer. The presence of a second non-voided polyester layer may also be of advantage if design considerations require the presence of a second metal layer. If a second non-voided polyester layer is used, it may be the same as or different from the first non-voided polyester layer.

By using the composite films and methods of the invention, it is possible to obtain robust attachment of the metal layer to the substrate and, simultaneously, achieve a relatively defect-free metal layer. Such attributes may be of particular advantage in preparing circuit patterns produced by patternwise removal of a portion of the metal layer, for example by laser ablation, while maintaining excellent resistance to cracking or other defects that would interfere with the desired electrical conductivity of the circuit features.

Both the opaque layer and the non-voided layer comprise a polyester homopolymer and/or a copolyester. For each layer, the linear polyester has an intrinsic viscosity from about 0.5 to about 0.8, with about 0.6 being typical. Exemplary polyesters for preparing the opaque and non-voided layers are biaxially oriented polyethylene terephthalate (PET) film and biaxially oriented polyethylene naphthalate (PEN) film.

Especially useful for fabricating the opaque layer and/or non-voided layer is polyethylene terephthalate that has been biaxially oriented and heatset. Such a material is well known in the art, and is described for example in U.S. Pat. No. 4,375,494 to Stokes, incorporated herein by reference.

Polyethylene terephthalate polymer preparation techniques are well known to those skilled in the art and are disclosed in many texts, such as *Encyclopedia of Polymer Science and Engineering*, 2nd. Ed., Vol. 12, Wiley, N.Y., pp. 1-313. The polymer is typically obtained by condensing the appropriate dicarboxylic acid or its lower alkyl diester with ethylene glycol. Polyethylene terephthalate is formed from terephthalic acid or an ester thereof, and polyethylene naphthalate is formed from 2,7-naphthalene dicarboxylic acid or an ester thereof.

The intrinsic viscosity of the polyester for making the opaque layer or the non-voided layer may be from about 0.52 to about 0.80, preferably 0.54 to 0.70, particularly preferably 0.57 to 0.65. If the intrinsic viscosity is too low, even if other physical properties are appropriate and lamination on a substrate sheet is carried out satisfactorily, the film may become brittle. There does not appear to be a performance disadvantage to using polymers with intrinsic viscosity above about 0.80, but such polymers tend to be more expensive and more difficult to process in extrusion machinery. For purposes of this invention, the intrinsic viscosity of a polyester is measured at 25° C. using o-chlorophenol as a solvent.

The combined thickness of the first non-voided layer and the base layer will typically be in a range from 23 µm to 500 µm, with the first non-voided layer constituting from 5% to 40% of that thickness, or from 10% to 35%. Each of the layers will now be described, as well as ways of making the multilayer composite films of the invention.

Base Layer

The base layer comprises an opaque, biaxially oriented self-supporting polyester film. The polyester may for example be one obtained by condensing one or more dicarboxylic acids or their lower alkyl diesters, e.g., terephthalic acid, isophthalic, phthalic, 2,5-, 2,6- and 2,7-naphthalene dicarboxylic acid, succinic acid, sebacic acid, adipic acid, azelaic acid, diphenyl dicarboxylic acid, and hexahydroterephthalic acid or bis-p-carboxyl phenoxy ethane, optionally with a monocarboxylic acid, such a pivalic acid, with one or more glycols, e.g., ethylene glycol, 1,3-propanediol, 1,4-butanediol, neopentyl glycol and 1,4-cyclohexanedimethanol.

Typically, the polyester will be polyethylene terephthalate (PET) or polyethylene naphthalate (PEN), although others can be used. The base layer will typically have a thickness of at least 14 µm, or at least 60 µm, or at least 100 µm. Typically, the thickness will be at most 475 µm, or at most 335 µm, or at most 235 µm. Suitable compositions for making the base layer are described in U.S. Pat. No. 4,780,402, incorporated herein by reference. Biaxially oriented and heat-set films of polyethylene terephthalate are particularly useful according to this invention.

Suitable opacity of the base layer may be provided by including one or more particulate inorganic fillers. Examples include conventional inorganic pigments and fillers, and particularly metal or metalloid oxides, such as alumina, silica and titania, and alkaline metal salts, such as the carbonates and sulfates of calcium and barium. Carbon black may also be used. The particulate inorganic fillers may be of the microvoid-forming type, or non-microvoiding type. Suitable particulate inorganic fillers may be homogeneous and consist essentially of a single filler material or compound, such as titanium dioxide or barium sulfate alone. Alternatively, at least a proportion of the filler may be heterogeneous, the primary filler material being associated with an additional modifying component. For example, the primary filler particle may be treated with a surface modifier, such as a pigment, soap, surfactant coupling agent or other modifier to promote or alter the degree to which the filler is compatible with the polyester of the opaque layer.

In some embodiments, the polyester film is rendered opaque by including particles of barium sulfate, a material that adheres only poorly to polyester and that therefore causes void formation during biaxial orientation, resulting in increased opacity. (Barium sulfate contributes some opacity even in the absence of void formation.) Amounts of barium sulfate of at least 7%, and preferably in the range 10 to 25% by weight based on the weight of the linear polyester, have been found to be particularly suitable for the production of opaque films, about 20% by weight being especially effective. It is preferred that the base layer have a glossy surface and this may be achieved when the barium sulfate particles have an average particle size not exceeding 5 µm and preferably not exceeding 2 µm. Decreasing particle size improves the gloss of the base layer. Barium sulfate of average particle size of about 1 µm or even down to 0.7 µm produces film of satisfactory opacity and gloss. Particles having an average size in the range 4 to 6 µm generally provide a partially glossy or semi-matt surface.

The opacity of the base layer depends upon its thickness, the amount of filler or voiding agent present and processing conditions, and may be assessed in terms of its total luminous transmission, which may be measured by ASTM test method D-1003. As used herein, the terms "opaque", "opacity" and variants thereof refer to base layers having less than 25% total luminous transmission. Opaque base layers according to this invention typically have a total luminous transmission less than 20%, or less than 15%, or less than 10%. Base layers having a total luminous transmission near zero, i.e., less than 5%, can be derived by inclusion of barium sulfate particles as described above.

Organic pigments may also be used to impart color to the opaque layer, and may be especially useful when colors other than black or white are desired. Such pigments are well known in the art, and include for example phthalocyanine and anthraquinone. Dyes such as are known in the art may also be used to impart color to the opaque layer.

The oriented base layer may be produced by any known process for the production of oriented polyester films, such as processes comprising melt extrusion through a slot die onto a cooled casting surface where the polyester is quenched to the amorphous state, molecularly orienting by stretching at an elevated temperature in one direction or two mutually perpendicular directions, followed by heat setting. Such a process is described in British patent specification No. 838 708. While any of the draw ratios and drawing and heat-setting temperatures already known in the art may be employed in the production of film supports employed according to this invention, it has been found that higher draw ratios result in greater voiding and hence greater opacity. Greater voids are generally obtained when lower drawing and heat-setting temperatures are used. Biaxially oriented polyethylene terephthalate films are preferably produced using draw ratios in the range 3.0:1 to 4.2:1 in each direction at drawing temperatures of about 90° C. and heat-setting temperatures of about 210° C.

Non-Voided Polyester Layer

The polyester used in the non-voided layer will typically be polyethylene terephthalate (PET) or polyethylene naphthalate (PEN), although others can be used, including copolyesters (polyesters with more than one type of diol unit and/or more than one type of diacid unit). The non-voided polyester layer will typically have a thickness of at least 1 µm, or at least 5 µm, or at least 8 µm. Typically, the thickness will be at most 200 µm, or at most 140 µm, or at most 100 µm. The non-voided polyester layer may be applied to the opaque base layer by methods known in the art, for example by coextrusion followed by biaxial orientation as described above for the opaque base layer. Alternatively, extrusion coating or lamination onto the biaxially oriented base layer may be used.

The non-voided layer may be substantially clear, and does not contain barium sulfate, titanium dioxide, or other inorganic or organic pigments at levels that cause microvoiding. Any/all of these may however be used at non-voiding levels, typically less than 1%, as a slip additive. Typically, at least 0.1 wt % will be used. Slip additives, or lubricants, are commonly used in commercial practice to improve winding, tracking, modify coefficient of friction, etc. For example, one may use a blend of 0.1 micron and 1.5 micron SEAHOSTAR® granular silica particles (Nippon Shokubai of Osaka, Japan) at a total level of 0.1 wt % in the non-voided polyester layer. Other examples of suitable lubricants, or slip additives, include silica, alumina, titanium dioxide, calcium carbonate, barium sulfate, etc., and organic lubricants such as silicone particles, polytetrafluoroethylene, olefin waxes, etc. The lubricant typically has an average particle diameter of 2.5 μm or less, to minimize the formation of pinholes and to minimize surface haze or surface roughness, which can detract from the evenness of the metal layer subsequently deposited on the surface of the non-voided layer.

Metal Layer

The metal layer may contain pure metals or alloys, or other electrical conductors. Examples include aluminum, carbon (such as graphite), cobalt, copper, gallium, gold, indium, iridium, iron, lead, magnesium, mercury (as an amalgam), nickel, niobium, osmium, palladium, platinum, rhenium, rhodium, selenium, silicon (such as highly doped polycrystalline silicon), silver, tantalum, tin, titanium, tungsten, uranium, vanadium, zinc, zirconium, mixtures thereof, and alloys or metallic compounds of these elements. Preferably, the metal layer includes gold, platinum, palladium, iridium, or alloys of these metals, since such noble metals and their alloys are unreactive in biological systems. The metal layer may be any thickness, but preferably is 10 nm to 1 mm, more preferably, 20 nm to 100 μm, or even 25 nm to 1 μm. The metal layer may be provided by any means known in the art, including for example chemical plating, vapor deposition or plasma deposition. One particularly suitable technique is sputtering, using conditions known to the skilled person. In general web coating by vapor deposition may suitably be used, as described in the book "Web Processing and Converting Technology (Van Nostrand Reinhold Company—1984)—Chapter 11 entitled "High-vacuum roll coating" by Ernst K Hartwig.

The metal layer is directly in contact with the surface of the non-voided polyester layer, or on an interposed primer layer in contact with each. It may be coextensive with the non-voided polyester layer, or it may be on only a portion of the non-voided polyester layer. One exemplary way of producing the latter configuration is by laser ablation to remove portions of the metal layer, leaving other portions behind. Electrically conductive circuit patterns and the like can be made in this way, in which the metal layer is ablated into an electrode pattern. The patterned metal layer may also be coated or plated with additional metal layers. For example, the metal layer may be copper, which is then ablated with a laser into an electrode pattern. Subsequently, the copper may be plated with a titanium/tungsten layer, and then a gold layer, to form the desired electrodes. Preferably, however, only a single layer of gold is used, and it is directly in contact with the electrode substrate since this allows formation of the electrode sets without wet chemical etching steps. If a second metal layer is provided on the opposite side of the opaque base layer, as discussed earlier above, it may be either the same as or different from the first metal layer. As with the first metal layer, a primer may optionally be interposed between the second metal layer and the second non-voided polyester layer, in contact with each.

Method of Making the Composite Film

The opaque/non-voided film composite may conveniently be made by a process that includes multiple extrusion through a multiple orifice die or coextrusion of the composite layers, e.g., broadly as described in U.S. Pat. No. 3,871,947, followed by molecular orientation by stretching in one or more directions and heat setting. A convenient process and apparatus for coextrusion, known as single channel coextrusion, is described in U.S. Pat. No. 4,165,210 and GB patent specification No. 1,115,007. The method comprises simultaneously extruding streams of the first and second of two polyesters from two different extruders, uniting the two streams in a tube leading to a manifold of an extrusion die, and extruding the two polyesters together through the die under conditions of streamline flow so that the two polyesters occupy distinct regions of the flow without intermixing, whereby a film composite is produced. The method may be adapted to extrude three polyester streams to form a single sheet with an opaque layer sandwiched between two non-voided layers.

In some cases the following process may be used, for example if the non-voided layer is composed of a significant portion of a copolyester, for example >10 wt % of a terephthalate/isophthalate/ethylene glycol copolyester, blended with PET. Biaxial orientation of the polyester layers may be accomplished by stretching the composite in sequence in two mutually perpendicular directions typically at temperatures in the range of about 78 to 125° C. Generally, the conditions applied for stretching the composite may function to partially crystallize the non-voided polyester layer, and in such cases it is preferred to heat set the film composite under dimensional restraint at a temperature greater than the crystalline melting temperature of the non-voided layer, but lower than the crystalline melting temperature of the polyethylene terephthalate portions. The composite is then permitted or caused to cool, rendering the non-voided polyester layer essentially amorphous while high crystallinity is maintained in the opaque and non-voided portions. Therefore, the stretching operation is preferably followed by heat setting under dimensional restraint, typically at a temperature in the range 150 to 250° C. Convenient processes for stretching and heat setting are described in U.S. Pat. No. 3,107,139.

The metal layer(s) may be deposited on the non-voided polyester layer(s) overlying the opaque base layer, for example by standard vapor deposition or plasma deposition methods known in the art. Alternatively, an optional primer layer may first be applied to one or both of the non-voided polyester layers, and the surface of the primer layer then subjected to metal deposition. The primer layer may be applied via an in-line gravure coater, or any other suitable means. Suitable primers are typically based on aqueous polymer dispersions, emulsions or solutions of acrylic, urethane, polyester or other resins well known in the art. An example of one such coating, containing at least one sulfopolyester, at least one tetrablock copolymer resin, and at least one acrylamide/acrylic acid copolymer or salts thereof, is disclosed in U.S. Pat. No. 5,985,437 to Chappell et al.

Use of the Composite Film

The multilayer composite films of the invention may be processed, for example by laser ablation, to remove portions of the metal layer(s) and thereby form circuit patterns in the layer(s). The resulting patterned structures also constitute multilayer composite films according to the invention.

Laser ablation usually employs a high-powered excimer laser, such as a krypton-fluoride excimer laser with an illumination wavelength of 248 nm, to blast away surface material. This technique has been used to ablate metals, polymers and even biological material, such as the cornea of the human eye. Laser ablation systems are well known to those of ordinary skill in the art, and are described in U.S. Pat. Nos. 5,576,073 and 5,593,739, each of which is hereby incorporated by reference. The composite films may find use in any of a number of applications. One particular application is the manufacture of medical diagnostic strips, for example glucose test strips. In some embodiments intended for medical or other applications employing processing at somewhat elevated temperatures such as 95° C., copolyesters commonly used as heatseal layers for film packaging applications may be excluded from the composite film.

The drawing shows an image of a prior art film 1 prepared by sputtering a gold layer onto the surface of a voided polyethylene terephthalate film, followed by laser ablation to form a line 2 such as would be used to prepare a circuit pattern. The image was formed after application and removal of a pressure-sensitive adhesive tape, which pulled away a portion of gold line 2 to leave a bare area 3 on the film.

EXAMPLES

Example 1

An opaque/non-voided film composite of the invention was formed by coextrusion. The base layer, of 237 microns final thickness, consisted of conventional film-forming polyethylene terephthalate homopolymer, intrinsic viscosity of about 0.590, containing 18% by weight, based on the weight of polyethylene terephthalate, of barium sulfate particles of average particle size 0.6 microns. This base layer was coextruded with a non-voided layer, of 13 microns final thickness, of a conventional film-forming polyethylene terephthalate homopolymer, intrinsic viscosity of about 0.600, containing 0.10% by weight, based on the weight of polyethylene terephthalate, of a blend of 0.1 micron and 1.5 micron SEAHOSTAR® granular silica particles. Both layers were simultaneously extruded and combined through a film-forming die, and quenched upon a rotating cooled quenching drum to the amorphous state. The opaque/non-voided film composite was subsequently stretched at draw ratios of 3.0:1 first in the longitudinal direction and then 3.5 in the transverse direction at a temperature of about 90° C., then heat set at about 225° C. Final thickness of the biaxially-oriented opaque/non-voided film composite was 250 microns. Film opacity, as measured by Total Luminous Transmission according to ASTM D1003, was 7.5%. The 60° gloss values (ASTM D2457) for the base layer and for the non-voided layer were 61% and 112%, respectively.

A gold layer is sputtered onto the non-voided film, and a pressure-sensitive adhesive tape is applied to the gold layer and then peeled off. Little or no gold is pulled away from the non-voided film by the adhesive tape.

Example 2

An opaque/non-voided film composite of the invention was formed by coextrusion. The base layer, of 225 microns final thickness, consisted of conventional film-forming polyethylene terephthalate homopolymer, intrinsic viscosity of about 0.590, containing 18% by weight, based on the weight of polyethylene terephthalate, of barium sulfate particles of average particle size 0.6 microns. This base layer was coextruded with a non-voided layer, of 25 microns final thickness, of a conventional film-forming polyethylene terephthalate homopolymer, intrinsic viscosity of about 0.600, containing 0.10% by weight, based on the weight of polyethylene terephthalate, of a blend of 0.1 micron and 1.5 micron SEAHOSTAR® granular silica particles. Both layers we simultaneously extruded and combined through a film-forming die, and quenched upon a rotating cooled quenching drum to the amorphous state. The opaque/non-voided film composite was subsequently stretched at draw ratios of 3.0:1 first in the longitudinal direction and then 3.5 in the transverse direction at a temperature of about 90° C., then heat set at about 225° C. Final thickness of the biaxially-oriented opaque/non-voided film composite was 250 microns. Film opacity, as measured by Total Luminous Transmission, was 6.3%. The 60° gloss values for the base layer and for the non-voided layer were 62% and 103%, respectively.

A gold layer is sputtered onto the non-voided film, and a pressure-sensitive adhesive tape is applied to the gold layer and then peeled off. Little or no gold is pulled away from the non-voided film by the adhesive tape.

Example 3

An opaque/non-voided film composite of the invention was formed by coextrusion. The base layer, of 125 microns final thickness, consisted of conventional film-forming polyethylene terephthalate homopolymer, intrinsic viscosity of about 0.590, containing 18% by weight, based on the weight of polyethylene terephthalate, of barium sulfate particles of average particle size 0.6 microns. This base layer was coextruded with two non-voided layers, of approximately 12 microns final thickness on each side, of a film-forming polyester copolymer of approximately 82 mol % ethylene terephthalate and approximately 18 mol % ethylene isophthalate, intrinsic viscosity of about 0.610, containing 0.18% by weight, based on the weight of polyethylene terephthalate, of ceramic microsphere particles. All three layers we simultaneously extruded and combined through a film-forming die and then quenched upon a rotating cooled quenching drum to the amorphous state. The opaque/non-voided film composite was subsequently stretched at draw ratios of 3.0:1 first in the longitudinal direction and then 3.6 in the transverse direction at a temperature of about 90° C., then heat set at about 230° C. Final thickness of the biaxially-oriented opaque/non-voided film composite was 150 microns. Film opacity, as measured by Total Luminous Transmission, was 8.5%.

A gold layer is sputtered onto the non-voided film, and a pressure-sensitive adhesive tape is applied to the gold layer and then peeled off. Little or no gold is pulled away from the non-voided film by the adhesive tape.

Comparative Example 1

A conventional film-forming polyethylene terephthalate homopolymer, intrinsic viscosity of about 0.590, containing 18% by weight, based on the weight of polyethylene terephthalate, of barium sulfate particles of average particle size 0.6 microns, was extruded through a film-forming die and quenched upon a rotating cooled quenching drum to the amorphous state. The film was subsequently stretched at draw ratios of 3.0:1 first in the longitudinal direction and then 3.5 in the transverse direction at a temperature of about 90° C., then heat set at about 225° C. Final thickness of the voided, opaque white biaxially oriented film was 250 microns. Film opacity, as measured by Total Luminous Transmission, was 6.5%. The 60° gloss value was 55%.

A gold layer is sputtered onto the voided film, and a pressure-sensitive adhesive tape is applied to the gold layer and then peeled off. Significant portions of the gold layer are found to have been pulled away from the voided film by the adhesive tape.

Comparative Example 2

A film was formed from a conventional film-forming polyethylene terephthalate homopolymer, intrinsic viscosity of about 0.560, containing 10% by weight, based on the weight of polyethylene terephthalate, of a concentrate that initiates voiding and opacification. The concentrate was composed of 40 weight % anatase titanium dioxide pigment of approximately 0.19 micron crystal size and 60 weight % polypropylene homopolymer of Melt Index 4.0. A single layer of this film formed by extruding through a film-forming die and quenched upon a rotating cooled quenching drum to the amorphous state. The film was subsequently stretched at draw ratios of 3.2:1 first in the longitudinal direction and then 3.7 in the transverse direction at a temperature of about 90° C., then heat set at about 225° C. One surface was coated in-line by a gravure coater (during the film manufacturing process) with a print primer coating based on an aqueous acrylic dispersion at a dry coat-weight of 0.09 g/m². Final thickness of the white biaxially oriented film was 50 microns. Film opacity, as measured by Total Luminous Transmission, was 28%.

A gold layer is sputtered onto the primer coating, and a pressure-sensitive adhesive tape is applied to the gold layer and then peeled off. Significant portions of the gold layer are found to have been pulled away from the voided film by the adhesive tape.

As seen from the above Examples and Comparative Examples, problems with secure attachment of a gold layer to a voided polyester film can be decreased or eliminated according to the invention by interposing a non-voided polyester layer.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A multilayer composite film comprising in sequence:
   a) a biaxially oriented, opaque polyester base layer;
   b) a non-voided polyester layer on and coextensively in contact with a surface of the base layer; and
   c) a metal layer on a surface of the non-voided polyester layer opposite the opaque polyester base layer, or on a primer layer on a surface of the non-voided polyester layer opposite the opaque polyester base layers;
   wherein the non-voided polyester layer does not contain a total of 1% or more of inorganic pigments.

2. The multilayer composite film of claim 1, wherein the opaque polyester base layer is an opaque polyethylene terephthalate layer.

3. The multilayer composite film of claim 1, wherein the opaque polyester base layer is a microvoided layer.

4. The multilayer composite film of claim 3, wherein the microvoided layer comprises particles of barium sulfate.

5. The multilayer composite film of claim 1, wherein the non-voided polyester layer is a polyethylene terephthalate layer.

6. The multilayer composite film of claim 5, wherein the non-voided polyester layer is biaxially oriented.

7. The multilayer composite film of claim 1, wherein the metal layer comprises gold.

8. The multilayer composite film of claim 1, wherein the metal layer is coextensive with the surface of the non-voided polyester layer.

9. The multilayer composite film of claim 1, wherein the metal layer is on only a portion of the surface of the non-voided polyester layer, or on only a portion of the primer layer.

10. The multilayer composite film of claim 1, further comprising a second non-voided polyester layer coextensively contacting a second surface of the opaque polyester base layer.

11. The multilayer composite film of claim 10, further comprising a second metal layer contacting a surface of the second non-voided polyester layer opposite the surface thereof that contacts the second surface of the opaque polyester base layer, optionally with a primer layer interposed between and in contact with the second metal layer and the second non-voided polyester layer.

12. A method of making the multilayer composite film of claim 1, comprising a step of vapor depositing or plasma depositing a metal layer on a surface of a non-voided polyester layer coextensively contacting a biaxially oriented, opaque polyester base layer, or on a primer layer on a surface of the non-voided polyester layer.

13. The method of claim 12, wherein the non-voided polyester layer and the opaque polyester base layer are formed by a process comprising coextruding the layers and then biaxially orienting them.

14. The method of claim 12, wherein the depositing comprises sputtering.

15. The method of claim 12, wherein the metal layer formed by the depositing step is coextensive with the surface of the non-voided polyester layer.

16. The method of claim 12, further comprising pattern-wise removing a portion of the metal layer.

17. The method of claim 16, wherein the step of pattern-wise removing comprises ablating said portion with a laser.

* * * * *